United States Patent Office 3,711,508
Patented Jan. 16, 1973

3,711,508
PHTHALOCYANINE DYESTUFFS
Manfred Groll, Cologne, Germany, assignor to Farbenfabriken Bayer Aktiengesellschaft, Leverkusen, Germany
No Drawing. Filed May 28, 1970, Ser. No. 41,646
Claims priority, application Germany, June 6, 1969,
P 19 28 677.2
Int. Cl. C09b 47/04
U.S. Cl. 260—314.5         1 Claim

ABSTRACT OF THE DISCLOSURE

Phthalocyanine dyestuffs of formula

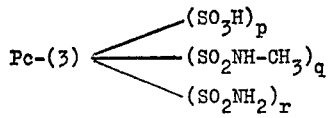

wherein

Pc denotes the residue of a copper or nickel phthalocyanine,
$p$ denotes a number from 1.0 to 1.9,
$q$ denotes a number from 0.9 to 1.2 and
$r$ is a number from 0.5 to 1.0,
    with $p$, $q$ and $r$ representing statistical average values, the sum of which is 2.9 to 3.3 and their use for dyeing and printing of cellulose containing materials.

---

The new dyestuffs are distinguished by excellent solubility in water and very good affinity for cotton and especially for viscose rayon.

---

The subject of the invention is new mixtures of water-soluble phthalocyanine dyestuffs which in the form of their free acids correspond to the formula

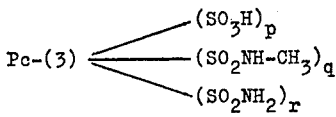

(I)

as well as processes for their manufacture and their use for dyeing cellulose materials and viscose rayon. In Formula I Pc denotes the residue of a Cu- or Ni-phthalocyanine,
$p$ denotes a number from 1.0 to 1.9,
$q$ denotes a number from 0.9 to 1.2 and
$r$ denotes a number from 0.5 to 1.0,
    with $p$, $q$ and $r$ representing statistical average values, the sum of which is 2.9 to 3.3

In dyestuffs of Formula I, each sulphonic acid group or sulphonamide group is bonded to a different benzene ring of the phthalocyanine in the 3-position. Possible metals are copper or nickel. Copper phthalocyanine dyestuffs of Formula I are particularly preferred.

The new phthalocyanine compounds of Formula I are manufactured by condensing a phthalocyanine-sulphonic acid chloride—preferably in the form of an aqueous suspension—which in the form of the free acid the formula

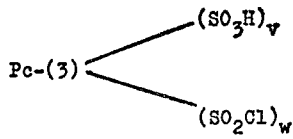

(II)

wherein

Pc has the above-mentioned significance,
$v$ represents a number from 0.9 to 1.3 and
$w$ represents a number from 1.9 to 2.4,
    with $v$ and $w$ representing statistical average values, the sum of which is 2.9 to 3.3, with methylamine and ammonia, simultaneously or successively, and optionally treating the resulting dyestuffs with alkali. In this condensation, which is in general carried out at temperatures of about 0 to about 90° C., sulphonic acid chloride groups can be converted into sulphonic acid groups by hydrolysis. The reaction of the phthalocyanine-sulphonic acid chloride of Formula II with methylamine and ammonia can be carried out in a single reaction step or in separate individual steps. The dyestuff can be isolated in the usual manner by salting out, filtering off and drying. Preferably, the new dyestuffs are isolated by removing the water by means of a distillation or a spray drying.

The metal-containing phthalocyanine-sulphonic acid chlorides of Formula II which are employed as starting substances in accordance with the process can be manufactured in a known manner, for example by treating the corresponding metal-containing phthalocyanines or corresponding metal-containing phthalocyanine-sulphonic acids with chlorosulphonic acid. The sulphochlorination can optionally be carried out in the presence of carbon tetrachloride or of acid chlorides, such as thionyl chloride or phosphorus pentachloride, as is for example described in German patent specification 891,121. Appropriately, the sulphonic acid groups of the phthalocyanine-sulphonic acid chlorides of Formula II are converted into their alkali salts before the reaction with methylamine and ammonia. After the condensation has taken place, sulphonic acid chloride groups which may still have remained are saponified.

The new phthalocyanine dyestuffs can be used for dyeing and printing cellulose-containing materials of fibrous structure, such as linen, regenerated cellulose, cotton and above all viscose rayon.

The new dyestuffs are distinguished by excellent solubility in water and very good affinity for cotton and especially for viscose rayon. On cellulose materials they generally yield fast dyeings and prints of pure blue to turquoise colour shades which are distinguished by good fastness properties.

In the example which follows, parts represent parts by weight; the temperatures given are degrees centigrade.

EXAMPLE 1

87.4 parts of the copper phthalocyanine-sulphonic acid-sulphonic acid chloride of formula

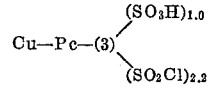

are introduced in the form of a weakly acid paste into 660 parts of ice water. After neutralisation with sodium hydroxide solution, an aqueous methylamine solution which contains 3.7 parts of methylamine is first run at pH 10.0–10.2, followed by 120 parts of 1 N sodium hydroxide solution, thereafter by an aqueous ammonia solution which contains 1.7 parts of ammonia, and hereupon by further sodium hydroxide solution. In the course of this the temperature of the reaction mixture is initially kept at 0–5° and subsequently at 20–30°, and is raised up to about 80° towards the ends of the reaction.

The dyestuff is appropriately isolated by removing the solvent, which is optionally possible with the aid of a Venuleth distillation or a spray drying.

Depending on the acid content of the paste employed, 103–110 parts of an 80–85% strength turquoise-blue dyestuff containing about 1.7 sulphonic acid groups, 1.0 sulphonic acid methylamide groups and 0.5 sulphonic acid amide groups are obtained.

The copper phthalocyanine-sulphonic acid chloride-sulphonic acid used in this experiment was obtained by treating copper phthalocyanine with chlorosulphonic acid at 105–110° and post-treating the reaction melt with a little thionyl chloride at 80–85°.

If the copper phthalocyanine-sulphonic acid-sulphonic acid chloride used in paragraph 1 is replaced by the equimolecular amount of the nickel phthalocyanine-sulphonic acid-sulphonic acid chloride of formula

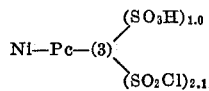

a somewhat greenish-tinged turquoise-blue dyestuff of similar composition is obtained.

EXAMPLE 2

87.4 parts of the copper phthalocyanine-sulphonic acid-sulphonic acid chloride of formula

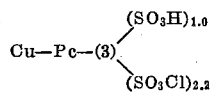

are introduced in the form of a weakly acid paste into 660 parts of ice water. After neutralisation with sodium hydroxide solution a mixture of 150 parts of water, 4.05 parts of methylamine (100%), 2.7 parts of ammonia (100%) and 150 parts of 1 N sodium hydroxide solution is run in at pH 10.0–10.2 and at a temperature which is slowly raised up to 25° C. Hereafter the initial pH value of 8–9 of the solution is kept by adding further sodium hydroxide—the temperature is raised up to 80° C. towards the end of the reaction. The dyestuff is isolated as described in Example 1.

Depending on the acid content of the paste employed, 103–110 parts of an 80–85% strength turquoise-blue dyestuff containing about 1.5 sulphonic acid groups, 1.0 sulphonic acid methylamide groups and 0.7 sulphonic acid amide groups are obtained.

The copper phthalocyanine-sulphonic acid chloride-sulphonic acid used in this experiment was obtained in accordance with the description of Example 1, paragraph 4.

Dyestuffs with similar properties are obtained by applying the procedure described in paragraph 1 and using a copper phthalocyanine-sulphonic acid chloride-sulphonic acid, which in the 3-position of the benzene nucleus contains 0.9 sulphonic acid groups and 2.4 sulphonic chloride groups or 1.3 sulphonic acid groups and 1.9 sulphonic chloride groups or 0.9 sulphonic acid groups and 2.0 sulphonic chloride groups; in the latter case the methylamine is reduced to 3.5 parts.

Patent claim:

1. Phthalocyanine dyestuffs of formula

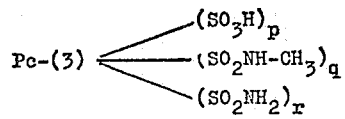

wherein

Pc denotes the residue of a copper or nickel phthalocyanine,
$p$ denotes a number from 1.0 to 1.9,
$q$ denotes a number from 0.9 to 1.2 and
$r$ is a number from 0.5 to 1.0,
   with $p$, $q$ and $r$ representing statistical average values, the sum of which is 2.9 to 3.3.

References Cited

UNITED STATES PATENTS 3,053,850    9/1962    Clark et al. _____ 260—314.5
3,239,536    3/1966    Barben et al. _____ 260—314.5

HARRY I. MOATZ, Primary Examiner

U.S. Cl. X.R.

8—1 XA, 54.2